March 26, 1935.  J. L. CHANEY  1,995,470
CLOSURE FOR THERMOMETER CASINGS
Filed May 7, 1934
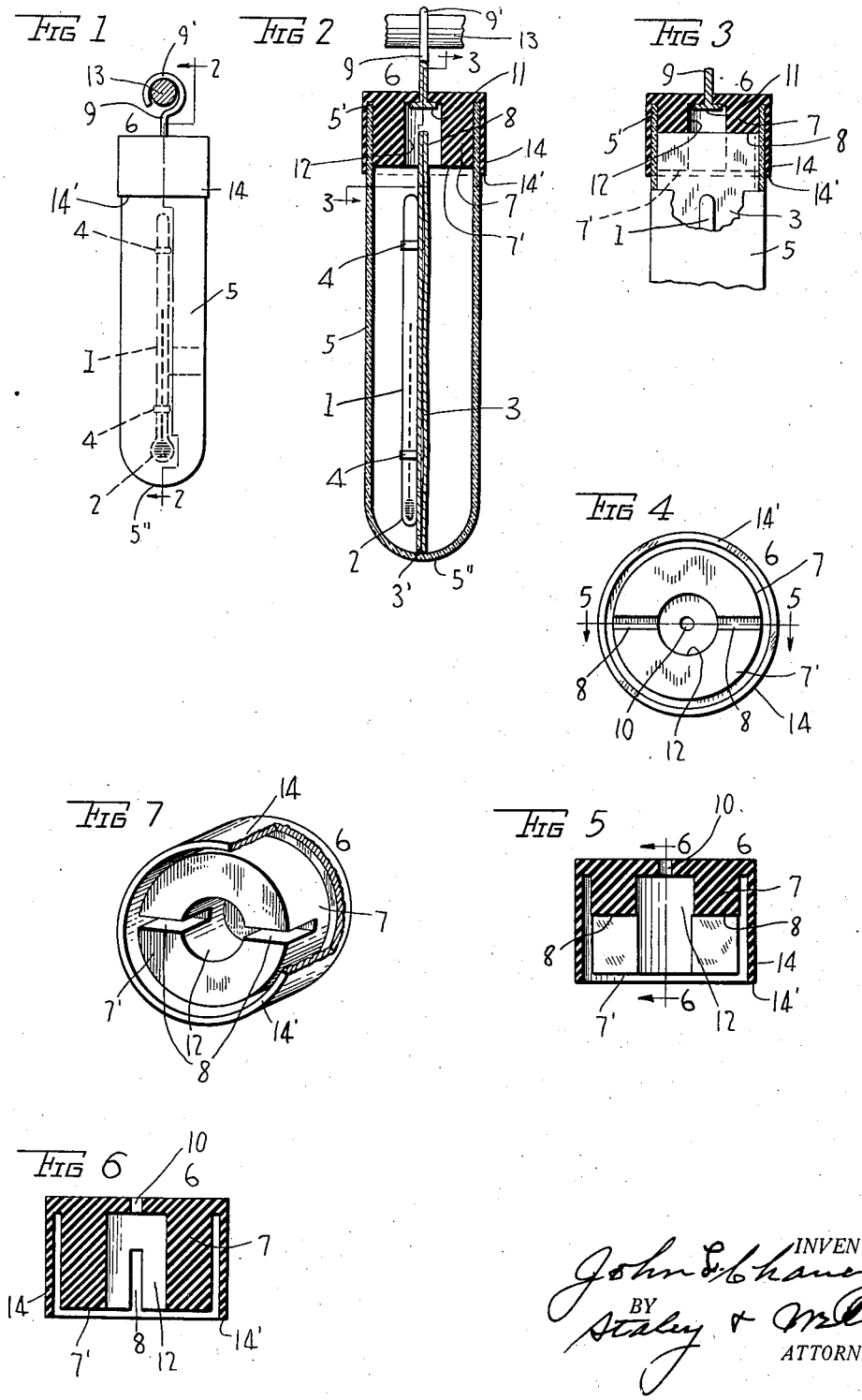
INVENTOR.
John L. Chaney
BY
Staley & Welch
ATTORNEYS.

Patented Mar. 26, 1935

1,995,470

UNITED STATES PATENT OFFICE 1,995,470

CLOSURE FOR THERMOMETER CASINGS

John L. Chaney, Springfield, Ohio

Application May 7, 1934, Serial No. 724,241

3 Claims. (Cl. 73—52)

This invention relates to improvements in enclosures for thermometers especially of the type intended to be suspended from a tray in a refrigerator, the invention relating more particularly to the cap for the enclosing means.

An object of the invention is the provision of a hanging thermometer enclosure having a cap or plug, preferably formed of a resilient material which not only grips and holds the outer transparent tube but also retains the scale card and thermometer tube in a central position in the enclosing tube.

Other objects and advantages will appear in the following specifications and claims.

In the accompanying drawing:

Fig. 1 is an elevation of the improved thermometer, the rod from which it is suspended being shown in transverse section.

Fig. 2 is an enlarged vertical section on the line 2—2 of Fig. 1.

Fig. 3 is a fragmentary vertical section on the line 3—3 of Fig. 2.

Fig. 4 is a bottom plan view of the cap on an enlarged scale.

Fig. 5 is a vertical section on the line 5—5 of Fig. 4.

Fig. 6 is a vertical section on the line 6—6 of Fig. 5.

Fig. 7 is a perspective view of the cap, the view being partly broken away and shown in section.

Referring to the drawing, 1 represents the thermometer tube having the bulb 2. The tube is clipped to a suitable scale card 3 by the clips 4 and is enclosed in the hollow interior of the enclosing tube 5 formed of transparent glass. One end 5' of the enclosing tube is open while the other end is closed by the semi-spherical integral end 5''. As the thermometer is a hanging thermometer, the closed, rounded end of the enclosure is the lower end thereof, and obviously the scale card is inserted in the enclosing tube with the bulb end of the thermometer tube downward as shown. The lower end 3' of the scale card is rounded to conform to the curvature of the inner surface of the closed end 5'' of the outer tube whereby the lower end of the scale card is centered in the outer tube.

To close the upper end of the outer tube and to provide an anchorage for the hook which will be mentioned later, a cap 6, preferably of a resilient material such as moulded rubber, is employed. The cap is shown in detail on an increased scale in Figs. 4 to 7, inclusive, and consists of a cylindrical plug portion 7 of a size adapted to be slidably inserted in the upper portion of the bore of the outer enclosing tube in the same manner as a cork is inserted in a bottle.

To hold the upper end of the scale card, the plug portion 7 is slotted by the slots 8, 8 which are diametrically positioned and extended upwardly in the plug body a sufficient distance to insure that the scale card will be gripped by the walls of the slots 8, 8. To suspend the device, a metallic hook member 9 preferably formed of a soft metal is passed through a small opening 10 in the upper portion of the plug 7. The hook 9 is prevented from pulling through by the enlarged head 11 formed thereon, the head 11 being accommodated in the plug 7 in the axially disposed tubular recess indicated at 12 in the several views.

The portion of the hook member 9 which projects above the cap is formed into a hook 9' and being of relatively soft metal, may be bent around the rod from which the device is to be suspended, indicated at 13. The hook 9' may be closed sufficiently to prevent accidental dislodgment, yet it can easily be opened if it is desired to remove the device.

In order to protect the edges of the glass and increase the friction between the plug and glass as well as to improve the appearance and conceal portions of the plug, a tube-like skirt 14 is formed integrally with the plug portion 7. This skirt 14 extends down over the outer portion of the upper end of the outer tube 5. As shown, the length of the skirt 14 is such that the lower end 14' thereof is slightly longer than the plug 7, whereby in a view similar to Fig. 1, the lower end 7' of the plug is concealed. In the perspective view Fig. 7, a portion of the skirt is broken away to indicate how the upper end of the enclosing tube 5 is received between the plug 7 and the skirt 14.

To assemble the device, the upper end of the scale card 3 is inserted into the slots 8 of the plug 7 after which the cap is forced on the open end 5' of the enclosing tube with the scale card in the hollow interior thereof.

Having thus described my invention, I claim:

1. In a thermometer, a thermometer tube, a flat scale member for said tube, a transparent casing for said tube and scale member having an open end, a resilient plug of rubber inserted in the open end of said casing, the inner end of said plug being slotted to receive an end of said scale member, and a wire-like hook member having a head, said plug having a recess to receive the head of said wire-like hook member and an aperture leading therefrom from which said member extends.

2. In a thermometer, a thermometer tube, a scale member for said tube, a transparent casing open at one end for said scale and tube, and a resilient plug inserted in the open end of said casing having an integrally formed resilient skirt to embrace and frictionally engage the outer wall of said casing, said plug having a slot to receive an end of said flat scale member.

3. In an enclosed suspended thermometer, a thermometer tube, a scale card for said thermometer tube, an enclosing transparent casing open at one end, a one-piece closure means of a resilient material for said open end of said enclosing casing, said closure means having a plug portion adapted to frictionally fit into the bore of the casing, said plug portion having diametrically disposed axially extending slots adapted to receive an end of the scale card, said closure having an annular skirt adapted to frictionally fit over the open end of the enclosing tube, and a suspension element having an anchorage in the closure means.

JOHN L. CHANEY.